(No Model.)
R. W. MURPHY.
INK ROLLER FOR PRINTING PRESSES.
No. 487,759.  Patented Dec. 13, 1892.
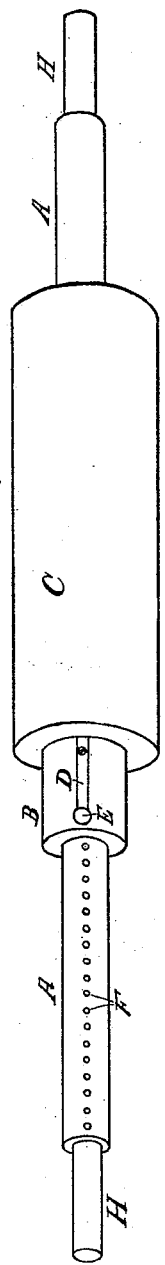
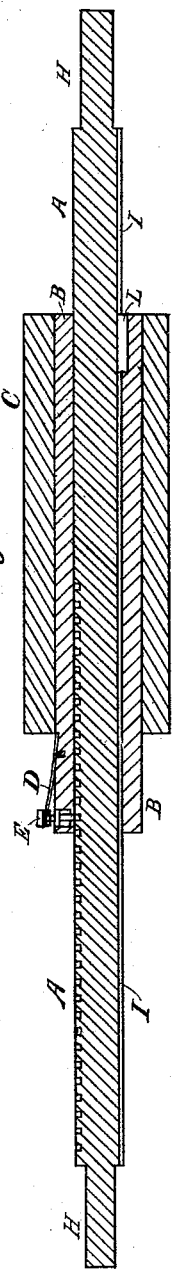
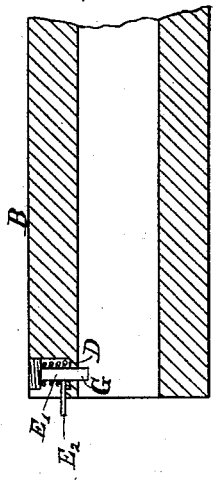
WITNESSES.
J. P. Hunter
C. E. Bogardus
INVENTOR
R. W. Murphy,
by H. L. Reynolds.
his atty.

United States Patent Office.

ROBERT W. MURPHY, OF SEATTLE, WASHINGTON.

INK-ROLLER FOR PRINTING-PRESSES.

SPECIFICATION forming part of Letters Patent No. 487,759, dated December 13, 1892.

Application filed September 9, 1891. Serial No. 405,240. (No model.)

*To all whom it may concern:*

Be it known that I, ROBERT W. MURPHY, a citizen of the United States, residing at Seattle, county of King, and State of Washington, have invented a new and useful Improvement in Ink-Rollers for Printing-Presses, of which the following is a specification.

In presses doing jobwork it frequently happens that the form used to print from will occupy but a small portion of the bed. In this case with the ordinary roller, while the entire roller is inked, only a small portion of it is used, thus resulting in a waste of ink and an unequal wear of the roller.

The object of my invention is to supply a roller which may be of any desired length, according to size of the form used, and which may be adjusted so as to coincide in position to that of the form. This result is obtained by the mechanism shown in the accompanying drawings, in which—

Figure 1 is a perspective view of a roller. Fig. 2 is a sectional view of the same roller; and Fig. 3, a detail sectional view of one end of the sleeve, showing another method of fixing it to the shaft.

Similar letters refer to similar parts in the different views.

A is the shaft of the roller, having journal-bearings H at each end and a keyway I cut the entire distance between the journal-bearings. Upon the side opposite to this keyway or at any other convenient portion of its circumference is a row of small shallow holes F, placed at a short distance apart. These holes are for fixing the roller at any convenient point and may extend the entire length of the shaft or only a portion of its length. Fitting snugly upon this shaft, but so that it may slide thereon, is a sleeve B. In one end of this sleeve is a pin E, which fits a hole in the sleeve and is pressed toward the shaft by a spring D. This pin E may be dropped into any one of the holes F, thus fixing the sleeve at any point on the shaft. This sleeve, also, has a key or projection L, which fits the keyway I in the shaft and prevents the sleeve from turning on the shaft. This sleeve B can be taken off or put on the shaft very readily. By having a number of sleeves to go upon the same shaft it is an easy matter to select and place upon the shaft the one which best suits the work in hand. A roller of any length can thus be used, and thus it can be placed at any point upon the shaft.

The sleeve B is surrounded by a layer C of the ordinary composition used for ink-rollers and made of glue, molasses, &c.

In Fig. 3 is shown a different style of pin for fastening the sleeve on the shaft. The pin E slides in a hole bored close to the end of the sleeve. A narrow slot is made from this hole out to the end of the shaft. Through this slot projects a small pin, which is fixed to the pin E, and by which it may be lift out of engagement with the hole F. Surrounding the pin E is a spiral spring, which presses the pin down upon the shaft. The upper end of this hole is stopped by a small screw-head or plate which is screwed into it.

What I claim, and desire to secure by Letters Patent, is—

1. The combination, in a roller for a printing-press, of the shaft A, having a keyway I cut thereon throughout its length and having a line of holes upon one side, the sleeve B upon said shaft and having a key or projection fitting the keyway in said shaft, the pin E upon said sleeve, and means for pressing said pin E into engagement with one of the holes F in the shaft A, substantially as set forth.

2. The combination, in a roller for a printing-press, of the shaft A, having a keyway I cut therein throughout its length and a row of holes F upon one side, the sleeve B, fitting snugly upon the shaft and having a key or projection fitting said keyway, a pin E upon the sleeve B, and a spring D for pressing said pin into engagement with one of the holes F, substantially as set forth.

ROBERT W. MURPHY. [L. S.]

Witnesses:
H. L. REYNOLDS,
MORITZ KOCH.